US010046726B2

(12) United States Patent
Richard

(10) Patent No.: US 10,046,726 B2
(45) Date of Patent: Aug. 14, 2018

(54) AIRBAG SAFETY SYSTEM FOR A TWO-WHEELED VEHICLE

(71) Applicant: ALLIED TREASURE INC, LIMITED, Kowloon (CN)

(72) Inventor: Chi-Hsueh Richard, Kowloon (CN)

(73) Assignee: ALLIED TREASURE INC, LIMITED, Kowloon (CN)

( * ) Notice: Subject to any disclaimer, the term of this patent is extended or adjusted under 35 U.S.C. 154(b) by 0 days.

(21) Appl. No.: 15/429,190

(22) Filed: Feb. 10, 2017

(65) Prior Publication Data

US 2017/0232921 A1 Aug. 17, 2017

Related U.S. Application Data

(60) Provisional application No. 62/295,508, filed on Feb. 16, 2016, provisional application No. 62/376,413, filed on Aug. 18, 2016.

(51) Int. Cl.
| | |
|---|---|
| B60R 21/231 | (2011.01) |
| B60R 21/0132 | (2006.01) |
| B60R 21/235 | (2006.01) |
| B60R 21/261 | (2011.01) |
| B62J 27/00 | (2006.01) |
| B60R 21/015 | (2006.01) |
| B60R 21/01 | (2006.01) |

(52) U.S. Cl.
CPC ........ *B60R 21/231* (2013.01); *B60R 21/0132* (2013.01); *B60R 21/0155* (2014.10); *B60R 21/235* (2013.01); *B60R 21/261* (2013.01); *B62J 27/00* (2013.01); *B60R 2021/01027* (2013.01); *B60R 2021/23107* (2013.01); *B60R 2021/23523* (2013.01); *B60R 2021/2612* (2013.01)

(58) Field of Classification Search
CPC .................................................... B60R 21/231
USPC ........................................................ 280/730.1
See application file for complete search history.

(56) References Cited

U.S. PATENT DOCUMENTS

| | | | |
|---|---|---|---|
| 3,984,142 A | 10/1976 | Van Valkenburgh | |
| 4,227,717 A * | 10/1980 | Bouvier | B60R 21/16 280/730.2 |
| 5,125,682 A * | 6/1992 | Hensler | B60R 21/215 280/730.1 |
| 5,470,103 A * | 11/1995 | Vaillancourt | B60R 21/214 280/730.1 |
| 6,773,028 B2 * | 8/2004 | Itabashi | B60R 21/23138 280/730.1 |

(Continued)

FOREIGN PATENT DOCUMENTS

| | | |
|---|---|---|
| CN | 101456401 A | 6/2009 |
| CN | 101559806 A | 10/2009 |
| JP | 2002-264763 A | 9/2002 |

*Primary Examiner* — Faye M Fleming
(74) *Attorney, Agent, or Firm* — Chieh-Mei Wang

(57) ABSTRACT

An airbag safety system is provided with two or more safety airbags which can be adjoined to protect the rider when a crash occurs. A stabilizing mechanism is used to cause the inflated airbags to adjoin each other so as to form a stable protection space between the vehicle and the adjoined airbags. The adjoined airbags are shaped to meet a rider's ergonomics, making sure the rider can be caped for head protection and can be protected within the space surrounded by the airbags from being thrown away off the vehicle and subject to serious injuries.

20 Claims, 7 Drawing Sheets

(56) References Cited

U.S. PATENT DOCUMENTS

| | | | | |
|---|---|---|---|---|
| 6,932,379 B2* | 8/2005 | Yamazaki | ............... | B60R 21/16 180/219 |
| 7,044,499 B2* | 5/2006 | Miyata | ................. | B60R 21/231 280/729 |
| 7,137,647 B2* | 11/2006 | Adomeit | ............... | B60R 21/231 280/729 |
| 7,661,500 B2* | 2/2010 | Sonoda | .................. | B60R 21/16 180/190 |
| 7,806,221 B2* | 10/2010 | Mishra | ................. | B60R 19/205 180/271 |
| 7,828,106 B1* | 11/2010 | Ratajski | ................. | B60R 21/13 180/274 |
| 2005/0127646 A1* | 6/2005 | Kobayashi | ............ | B60R 19/205 280/730.2 |

* cited by examiner

AIRBAG SAFETY SYSTEM FOR A TWO-WHEELED VEHICLE

FIELD

The disclosure relates to a crash protection for a rider of a wheeled vehicle. There are provided two or more safety airbags which can be adjoined to protect the rider when a crash occurs. A stabilizing mechanism is used to cause the inflated airbags to adjoin each other so as to form a stable protection space between the vehicle and the airbags. When the safety airbags are inflated, the airbags are shaped to meet a rider's ergonomics, making sure the rider can be caped for head protection and can be protected within the space surrounded by the airbags from being thrown away off the vehicle and subject to serious injuries.

BACKGROUND

As to known safety airbags for two-wheeled vehicles such as motorcycles or scooters, most are designed for cushioning an impact at the front end, and few are designed for cushioning an impact on the side ends of the vehicle. Concerning the prevention of a rider from being ejected off the vehicle, a design having a cover structure on the top of an airbag has been provided. However, it is difficult for these known safety airbag designs to provide a thorough protection for a rider under the situation where the impact is coming from many different directions. Therefore, a better approach to a crash protection of a two-wheeled vehicle is needed for effectively cushioning impacts from any directions and preventing the rider from being ejected off the vehicle.

BRIEF DESCRIPTION OF THE DRAWINGS

Implementations of the disclosure will now be described, by way of examples only, with reference to the attached figures.

DETAILED DESCRIPTION

The disclosure provides an airbag safety system, in particular an airbag safety system applicable to a two-wheeled vehicle.

Figure 1:
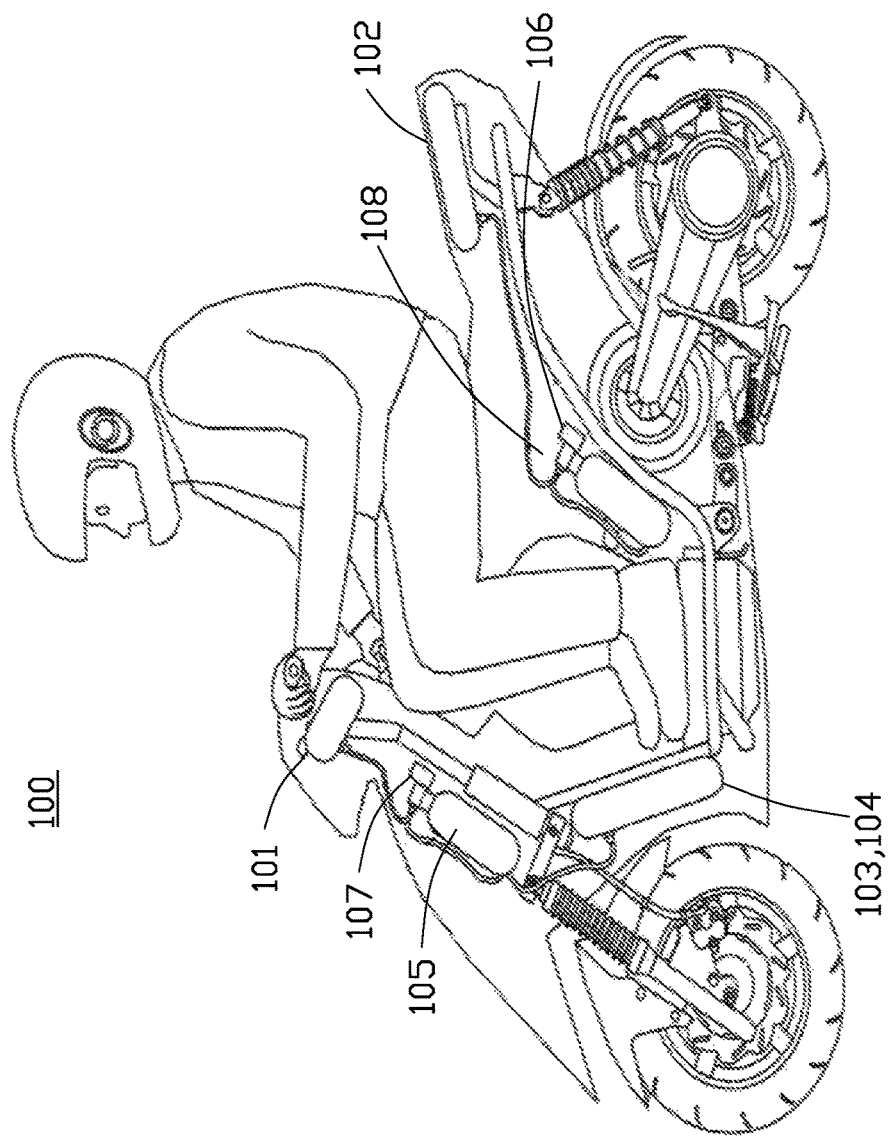
FIG. 1 shows a perspective representation of the arrangement of an airbag safety system for a two-wheeled vehicle according to one embodiment of the disclosure.

FIG. 1 shows an airbag safety system 100 for a two-wheeled vehicle.

The airbag safety system comprises a plurality of airbag modules, one or more inflation modules, and one or more inflation control modules. In FIG. 1, the airbag modules have a front airbag module 101 that can be disposed beneath the dashboard of the vehicle, a rear airbag module 102 that can be disposed at the rear end of a seat, and two side airbag modules 103, 104 (only one side airbag module is show herein) that can be disposed in the opposite lateral sides of the vehicle front body. The front airbag module 101 is coupled to a common inflation module 105 through a conduit, and two side airbag modules 103, 104 are coupled to the common inflation module 105 via another conduit. The rear airbag module 102 is coupled to an inflation module 106 via a further another conduit. Inflation control modules 107, 108 are connected to the inflation modules 105, 106 respectively. It should be noticed that the airbag module can be connected directly to the inflation module with no conduits.

The airbag module each includes a flexible airbag. A retainer can be included in each airbag module for housing the airbag. The airbag safety system when the airbag is flat or housed in the container can be referred to as being in an undeployed state; the airbag safety system when the airbag inflated with gas can be referred to as being in a deployed state. Before inflation, the airbags can be arranged in a multi-layered manner by folding, or in a planar spread-out manner.

Each of the inflation control modules 107, 108 comprises a plurality of sensing devices and at least one controller circuit. The controller circuit is configured to monitor the plurality of sensing devices and to determine if the vehicle is being impacted in an accident. When one of the inflation control module senses an impact force larger than a predetermined threshold on road, the corresponding inflation module will be actuated by a trigger signal from the inflation control module to inflate the airbags with gas. In response to the trigger signal, firstly the retainers will be opened to release the airbags to be inflated, and then the released airbag each will be expanded rapidly with gas inflation to reach its corresponding predetermined position and orientation. The inflation module inflates the airbags so rapidly that the airbag protection deploys before the rider is ejected off the vehicle or subject to significant impacts.

Figure 2:
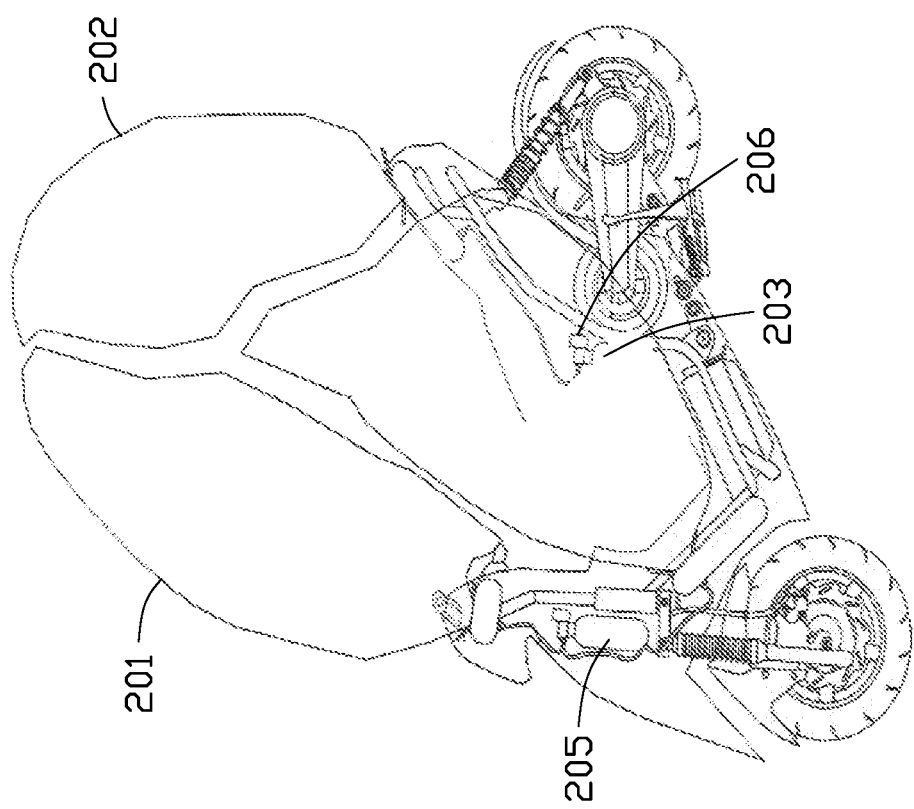
FIG. 2 shows a side view of the airbag safety system in a deployed state.

FIG. 2 shows a side view of the airbag safety system in the deployed state, in which the airbags 201, 202, 203 are released from their corresponding retainers as a result of the trigger signal, and inflated by the inflation modules 205, 206 with gas via the conduits. The conduits can be provided with tubes which can be bendable to be accommodated in any place in a vehicle and/or sustainable to high pressured passing gas. The gas flow forced into the airbags provides an initial pressure force in support of the expanding airbags so oriented at the predetermined positions as to surround the rider's body for protection. However, the expanded airbags cannot be oriented at the predetermined positions as required for protection once the inflation gas flow stops. In this situation, the airbags are not oriented at proper positions to protect the rider. Therefore, it is highly likely that the rider can be ejected off the vehicle and seriously injured even though the airbag protection using such a design are deployed.

To restrict the expanded airbags to be oriented at their predetermined positions after gas flow stops, the disclosure provides a stabilizing mechanism for airbags that makes the expanded airbags adjoined so as to keep at their predetermined positions. By the introduction of the stabilizing mechanism to the airbags, the expanded airbags at proximity are to be directed toward each other spontaneously and then adjoined from each other (e.g., within milliseconds). The adjoined airbags are supported stably with the aid of the stabilizing mechanism and able to prevent effectively the rider from being ejected off the vehicle. Furthermore, because of a space surrounded stably by the adjoined airbags, the rider can be isolated from damages caused by friction forces of the road or other objects.

In one embodiment of the disclosure, the stabilizing mechanism can be provided with fastening elements that can be arranged on the edges or surface of the airbags. With the aid of fastening elements, the expanded airbags at proximity will be adjoined from each other to be kept stably at said predetermined positions with the orientations. The fastening elements can have hook and loop fasteners, or two-component fasteners sold under the trademark VELCRO', etc., with high fastening strengths. The two-component fasteners sold under the trademark VELCRO® consist two fabric straps, with one having hooks and the other having loops that are smaller than the hooks; the loops can be caught by the hooks when the two straps are pressed against each other, thus causing a temporary fastening or binding between the two straps.

Figure 3:
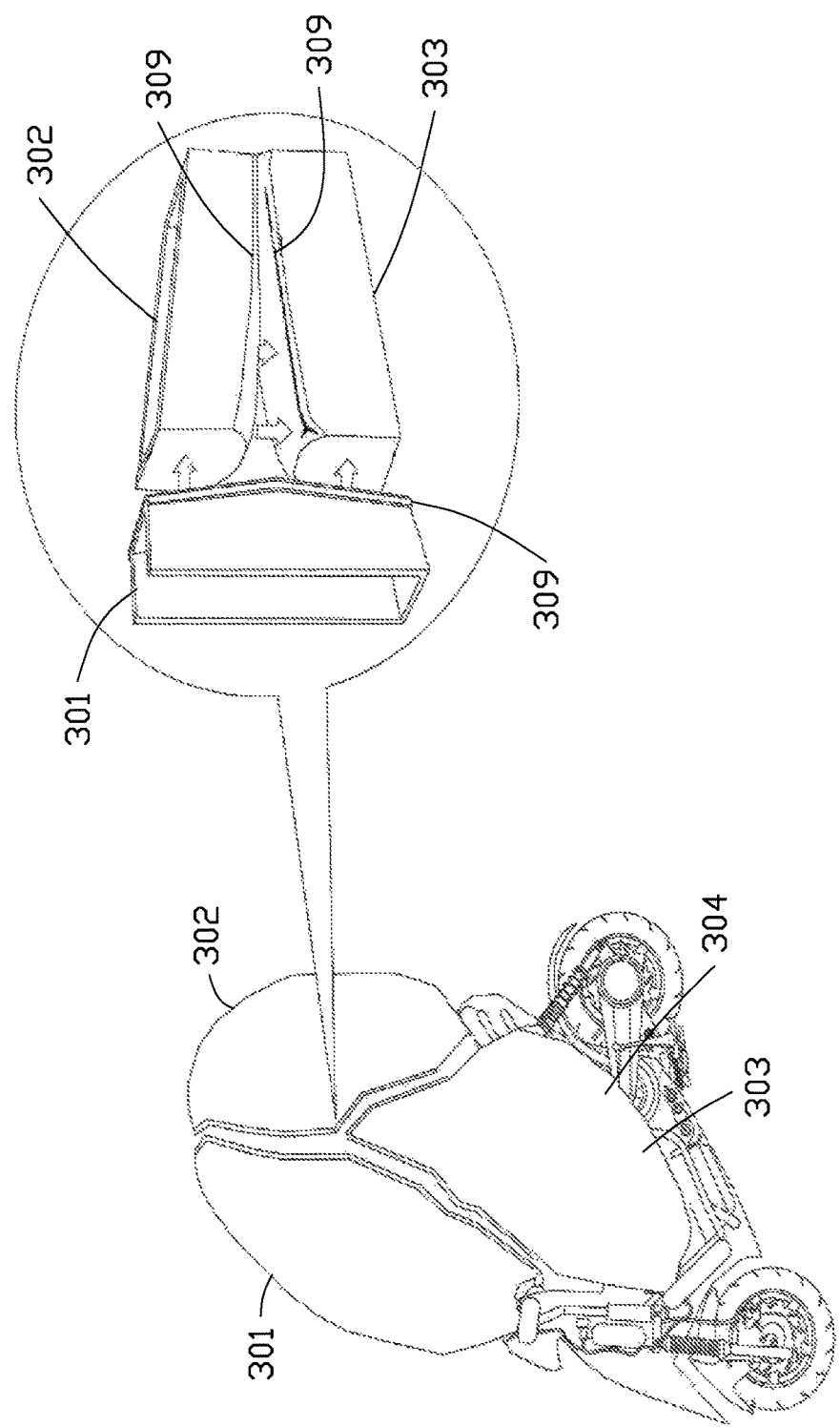
FIG. 3 shows a side view of the airbag safety system having fastening elements in a deployed state according to one embodiment of the disclosure.

FIG. 3 shows the side view of the airbag safety system having fastening elements in the deployed state according to one embodiment of the disclosure. All of the airbags are attached to the vehicle in the deployed state. Each of the airbags 301, 302, 303, 304 now has at least one strap of fastening elements on the edge. In the deployed state, the front airbag 301, the rear airbag 302 and two side airbags 303, 304 are getting proximate to each other in a short instant, as shown in left-hand side of FIG. 3. Once the expanded airbags are positioned at proximity, they are directed toward each other to be adjoined by the fastening elements. In the right-hand side of FIG. 3, a detailed illustration of the adjoining process is presented. The arrows indicate the direction of movement of the expanded airbags 301, 302, 303 at proximity due to the fastening elements 309. In the case of high speed impingement of human body onto the adjoined airbag, the adjoined airbags cannot be easily disjoined according to embodiments of the disclosure.

The safety airbags for a two-wheeled vehicle are typically shaped by a spherical surface or a rounded-corner surface in the deployed state. Although such designs can cushion the impact on the rider in an accident, it is not ensured that the rider can obtain a comprehensive protection that protects the rider's whole body from the impacts caused by an accident. In particular, the rider's head and neck portions can be harmed by the forces caused by ejection off due to the rider's inertia.

In order to minimize the damages caused to a rider in an event of a crash, airbags can be arranged in combination to meet a specific shape that constitutes a head capping structure on the top of an airbag. The head capping structure serves as a flexible barrier capping the rider's head and holding the rider's head protectively at the instant when the rider is going to be ejected off the vehicle. Also, the head capping structure can be taken as a buffering barrier to absorb and dissipate shock specifically for the rider's head and neck portions.

Figure 4:
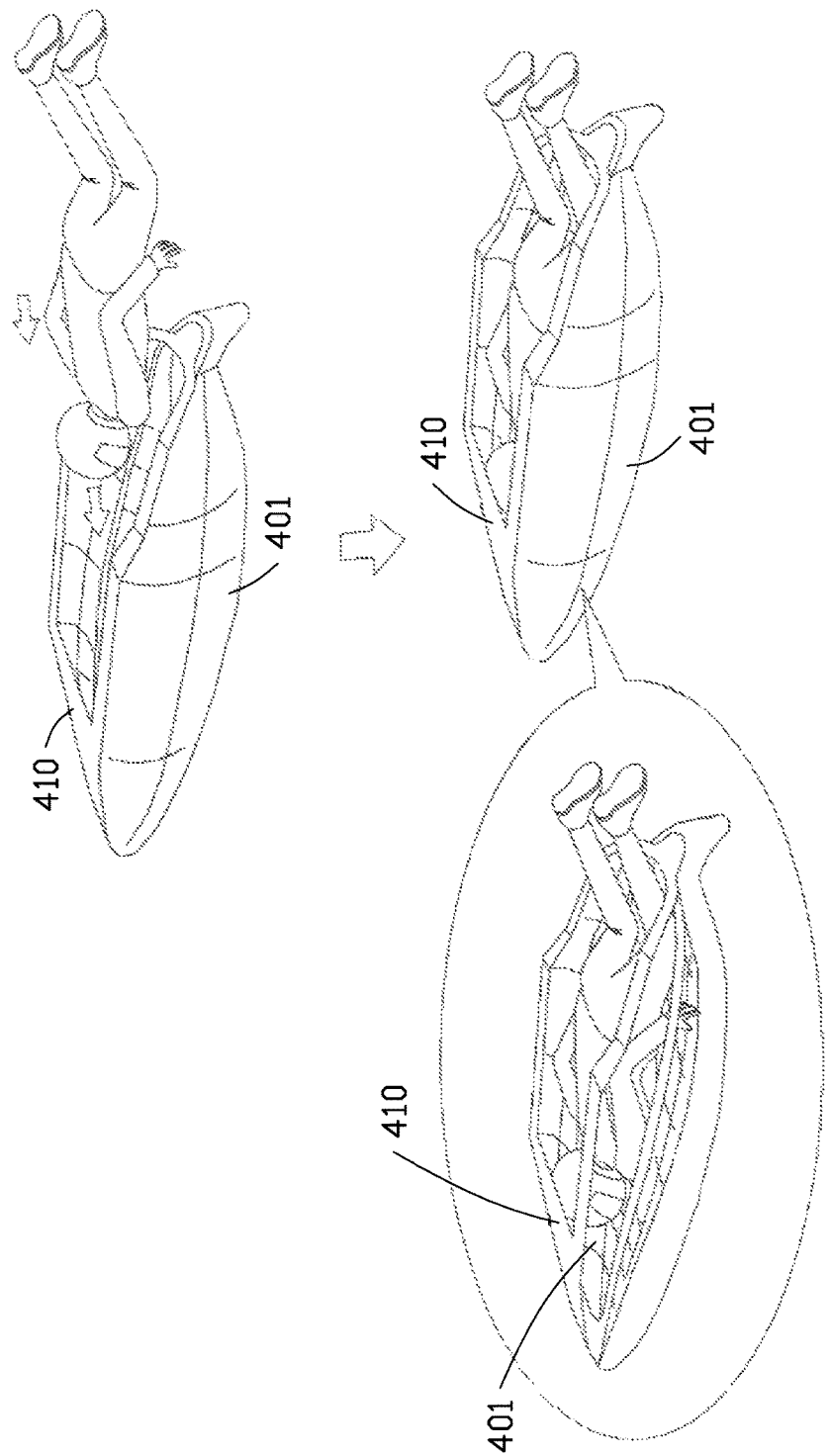
FIG. 4 shows a head capping structure provided on the top of a front airbag according to one embodiment of the disclosure.

FIG. 4 shows a head capping structure provided on the top of the front airbag according to one embodiment of the disclosure. As shown on the upper side of FIG. 4, the rider is being thrown off the vehicle forwardly to a front airbag 401 in the direction as indicated by the arrows; the expanded front airbag 401 has a head capping structure 410 that readily stands over the rider as a cap to be put on the rider's head. The head capping structure 410 has substantially a well-surrounding barrier covering the rider's head. In other words, the head capping structure 410 functions to protect the forehead, back head and side head of the rider in a well-surrounded manner. In the bottom side of FIG. 4, the head capping structure 410 of the front airbag 401 is capable of buffering the inertia force on the rider's head, and the rest portion of the front airbag 401 keeps the rider securely in the interior of the expanded airbag.

Depending on the directions at which the rider would be thrown off the vehicle, the head capping structure can be arranged on the top of other airbags than the front one. For example, if an accident has an impact on the rear end of the vehicle so that the rider would be thrown backwards, the head capping structure can be arranged on the top of the rear airbag. If an accident has an impact on either lateral side of the vehicle, the head capping structure can be arranged on the top of one side airbag.

Figure 5:
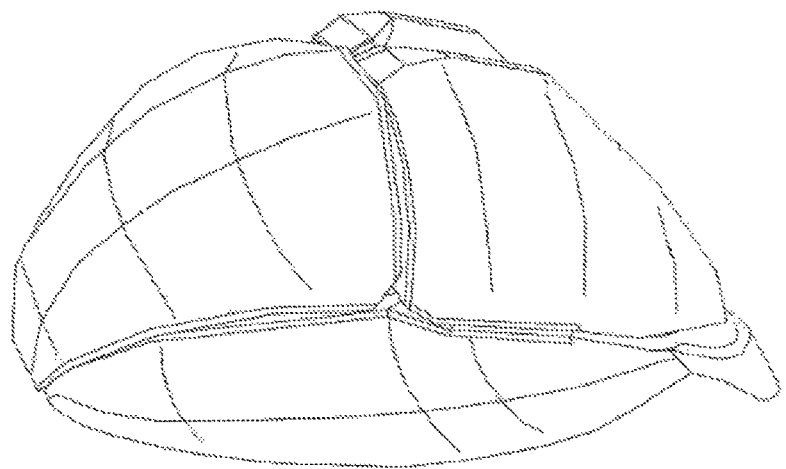
FIG. 5 shows an exemplary representation of the expanded airbags that are arranged in a specific shape according to one embodiment of the disclosure.
Figure 5:
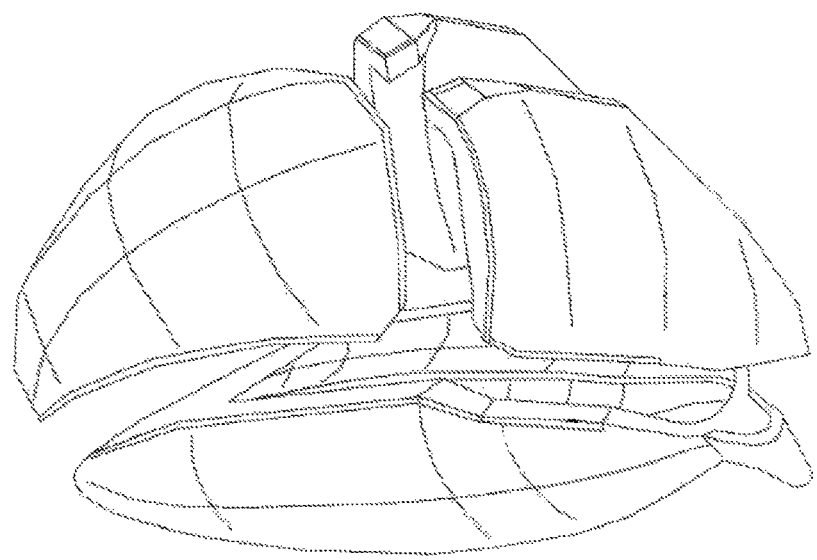

FIG. 5 shows an exemplary representation of the expanded airbags that are arranged in a specific shape according to one embodiment of the disclosure. On the left-hand side of FIG. 5, the expanded airbag each has a shell-like shape on the exterior surface and a specifically shaped structure on the interior surface. As shown on the right-hand side, the four airbags have been adjoined with the fastening elements which are arranged on the edge of the airbags. The four expanded airbags as a whole are shaped like a shell in appearance, which can absorb and dissipate shock from the outside. The interior space created between the four expanded airbags has a specific shape that meets the rider's ergonomics, optimizing the protection for the rider in an accident.

It should be noticed that the airbag safety system can be provided with suitable number of the airbags as long as the rider can be protected in a well-surrounded manner from being thrown off the vehicle. Therefore, by the modification of the structure of the airbags (e.g., larger surface area of the expanded airbags), the airbag safety system can be provided with three airbag modules, two airbag modules or other numbers of airbag modules.

Figure 6:
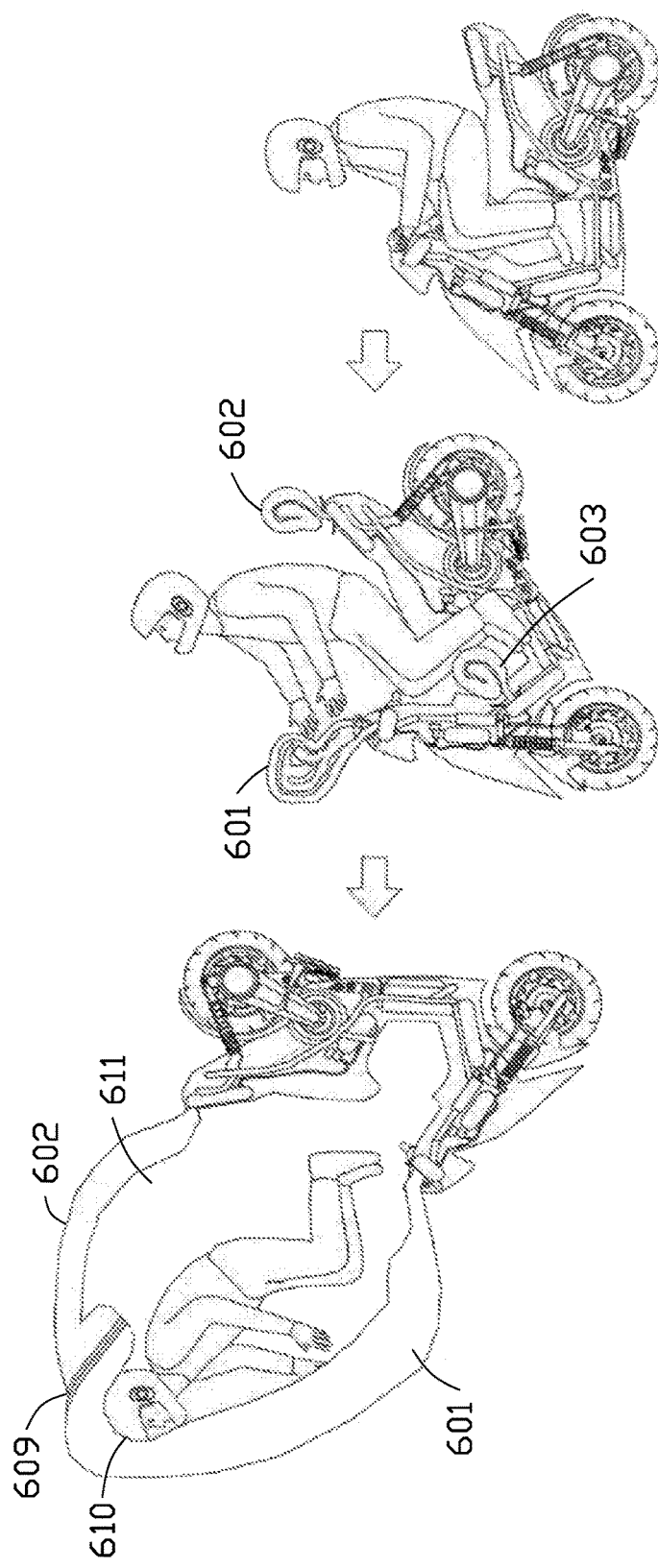
FIG. 6 shows the deployment process of an airbag safety system according to one embodiment of the disclosure.

FIG. 6 shows the deployment process of an airbag safety system according to one embodiment of the disclosure. The figure in the right-hand side shows that a rider steers a vehicle normally on road. The figure in the middle shows that the front airbag 601, rear airbag 602 and one side airbag 603 (the other side airbag is now shown here) are released and inflated within milliseconds when a collision event happens. The figure in the left-hand side shows that the airbags can be expanded in a predetermined manner to form a space 611 to protect the rider from thrown away off the vehicle or subject to serious injuries. The front airbag 601, the rear airbag 602 or both further can have a head capping structure 610 to provide an additional protection for the rider's head and neck portions. The head capping structure 610 serves as a flexible barrier capping the rider's head and holding the rider's head protectively at the instant when the rider is going to be ejected off the vehicle. The head capping structure that covers the rider's head can minimize the impact on the rider's head to a great degree. Furthermore, fastening elements 609 are provided on the edges of the airbags, making the space surrounded by the expanded airbags stable enough to provide a better protection.

Figure 7:
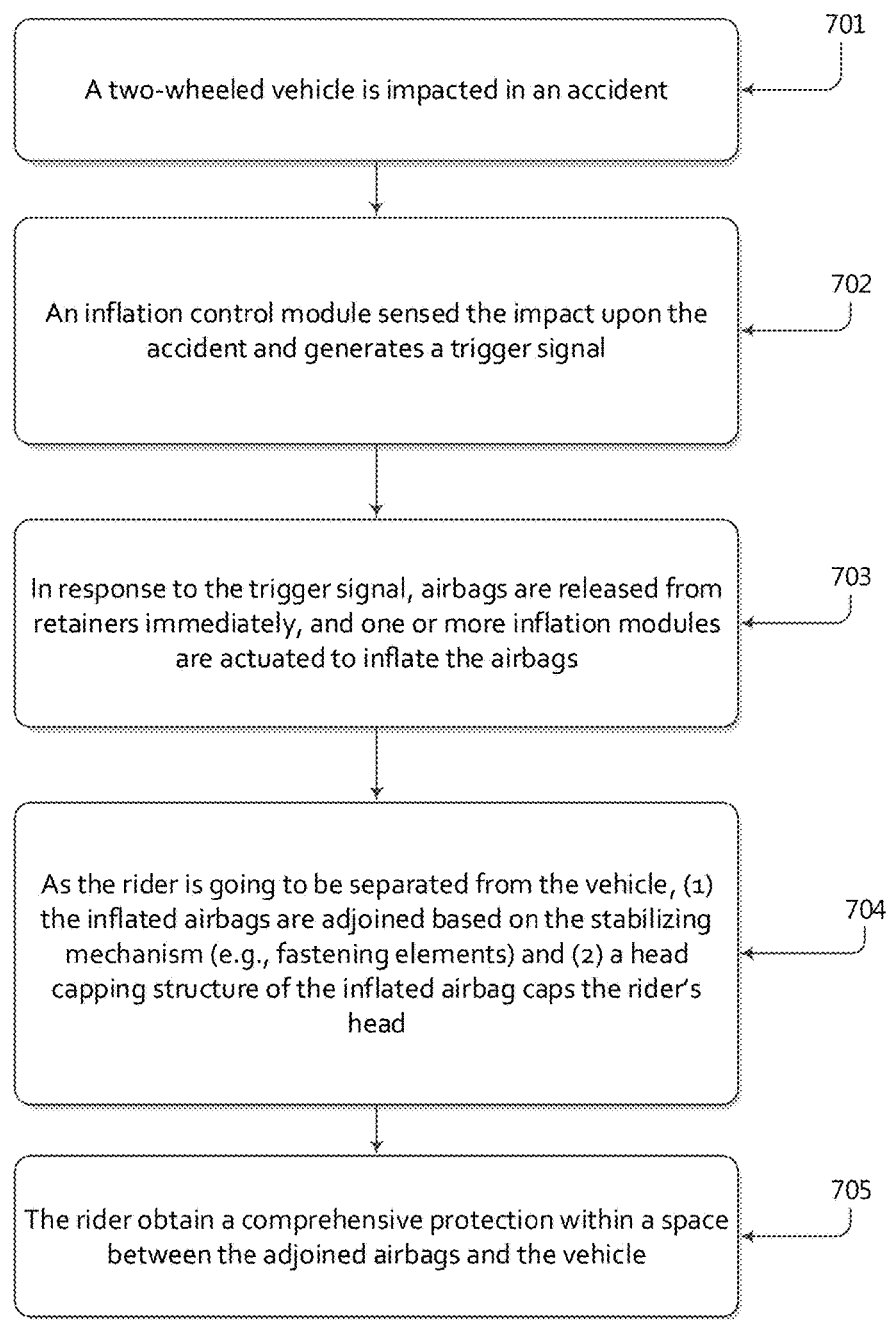
FIG. 7 shows a schematic flow chart of deployment process of an airbag safety system according to one embodiment of the disclosure.

FIG. 7 is a schematic flow chart of the deployment process of the airbag safety system. A two-wheeled vehicle is impacted in an accident at 701. An inflation control module sensed the impact upon the accident and generates a trigger signal at 702. In response to the trigger signal, airbags are released from retainers immediately, and an inflation module is actuated to inflate the airbags at 703. As the rider is going to be separated from the vehicle, (1) the inflated airbags are adjoined based on the stabilizing mechanism (e.g., fastening elements) and (2) a head capping structure of the inflated airbag caps the rider's head at 704. The rider obtain a comprehensive protection within a space between the adjoined airbags and the vehicle at 705.

The flexible airbags typically comprise a synthetic fabric, such as nylon. Other fabrics with high tension tolerance can also be used.

The inflation module comprises an inflator which can be provided with a compressed gas bottle or a chemical reaction gas generator. For example, if the compressed gas bottle is employed as the inflation module, the gas stored therein can be provided with inert gas such as nitrogen gas $N_2$.

The inflation control module includes at least one sensing device and a controller circuit. The sensing device can comprises a G sensor/Accelerometer, a seatbelt tension sensor, speed sensor, 3D position sensor, mercury switch or a combination of thereof.

Although the disclosure has been described with reference to specific exemplary embodiments, it will be evident that various modification and changes can be made to these embodiments without departing from the broader spirit and scope of the disclosure as set forth above. Accordingly, the specification and drawings are to be regarded in an illustrative rather than a restrictive sense.

What is claimed is:

1. An airbag safety system for a vehicle, comprising:
a plurality of airbags;
at least one sensing device configured to detect if an impact occurs to the vehicle;
at least one inflation module configured to expand the plurality of airbags with gas inflation upon the impact detected by the at least one sensing device;
wherein the plurality of airbags expanded are adjoined to each other by a stabilizing mechanism to form a stable space within which a rider is surrounded and protected from being ejected from the vehicle.

2. The airbag safety system of claim 1, wherein the stabilizing mechanism is provided with a plurality of fastening elements, each of which is arranged on the surface of one of the plurality of airbags so that the expanded airbags are adjoined to each other at predetermined positions with stable orientations.

3. The airbag safety system of claim 1, wherein at least one of the expanded airbags further has a head capping structure that has substantially a well-surrounding barrier capable of fully protecting a rider's head portion from shock of the impact.

4. The airbag safety system of claim 1, wherein the plurality of airbags are flexible and made of by synthetic fabrics with sufficient tension tolerance.

5. The airbag safety system of claim 1, wherein the inflation module can be provided with a compressed gas bottle, a chemical reaction gas generator or a combination thereof.

6. The airbag safety system of claim 1, wherein the sensing device can be provided with G sensors, accelerometers, seatbelt tension sensors, speed sensors, 3D position sensors, mercury switches or a combination thereof.

7. The airbag safety system of claim 1, wherein the stable space further has a peripheral shape which meets the rider's ergonomics.

8. The airbag safety system of claim 2, wherein the plurality of fastening elements can be provided with hook and loop fasteners, two-component fasteners or a combination thereof.

9. A method for protecting a driver on a vehicle, comprising:
generating a trigger signal upon an impact on the vehicle;
in response to the trigger signal, releasing a plurality of airbags and expanding the released airbags with gas inflation immediately;
by a stabilizing mechanism, adjoining the expanded airbags at predetermined positions with stable orientations so as to form a space surrounded by the adjoined airbags with the stable orientations to surround and protect the rider from being ejected off the vehicle.

10. The method of claim 9, wherein the stabilizing mechanism is provided with a plurality of fastening elements, each of which is arranged on the surface of one of the plurality of airbags so that the expanded airbags are adjoined to each other at predetermined positions with stable orientations.

11. The method of claim 9, wherein at least one of the expanded airbags further has a head capping structure that has substantially a well-surrounding barrier capable of fully protecting a rider's head portion from shock of the impact.

12. The method of claim 9, wherein the plurality of airbags are flexible and made of by synthetic fabrics with sufficient tension tolerance.

13. The method of claim 9, wherein the inflation module can be provided with a compressed gas bottle, a chemical reaction gas generator or a combination thereof.

14. The method of claim 9, wherein the sensing device can be provided with G sensor, accelerometer, seatbelt tension sensor, speed sensor, 3D position sensor, mercury switch or a combination thereof.

15. The method of claim 9, wherein the stable space further has a peripheral shape which meets the rider's ergonomics.

16. The method of claim 9, wherein the plurality of fastening elements can be provided with hook and loop fasteners, two-component fasteners or a combination thereof.

17. A wheeled vehicle, comprising:
at least two wheels;
a seat;
an airbag safety system; and
at least one controller circuit configured to monitor the airbag safety system,
wherein the airbag safety system further comprises:
a plurality of airbags;
at least one sensor configured to detect if an impact occurs to the vehicle;
at least one inflation module configured to expand the airbags with gas inflation upon the impact;
wherein the expanded airbags are adjoined to each other by a stabilizing mechanism to form a stable space within which a rider is surrounded and protected from being ejected from the vehicle.

18. The wheeled vehicle of claim 17, wherein the stabilizing mechanism is provided with a plurality of fastening elements, each of which is arranged on the surface of one of the plurality of airbags so that the expanded airbags are adjoined to each other at predetermined positions with stable orientations.

19. The wheeled vehicle of claim 17, wherein at least one of the expanded airbags further has a head capping structure that has substantially a well-surrounding barrier capable of fully protecting a rider's head portion from shock of the impact.

20. The wheeled vehicle of claim 18, wherein the plurality of fastening elements can be provided with hook and loop fasteners, two-component fasteners or a combination thereof.

\* \* \* \* \*